P. P. DE AGUIAR.
CONDIMENT HOLDER.
APPLICATION FILED MAY 5, 1920.
1,346,007. Patented July 6, 1920.
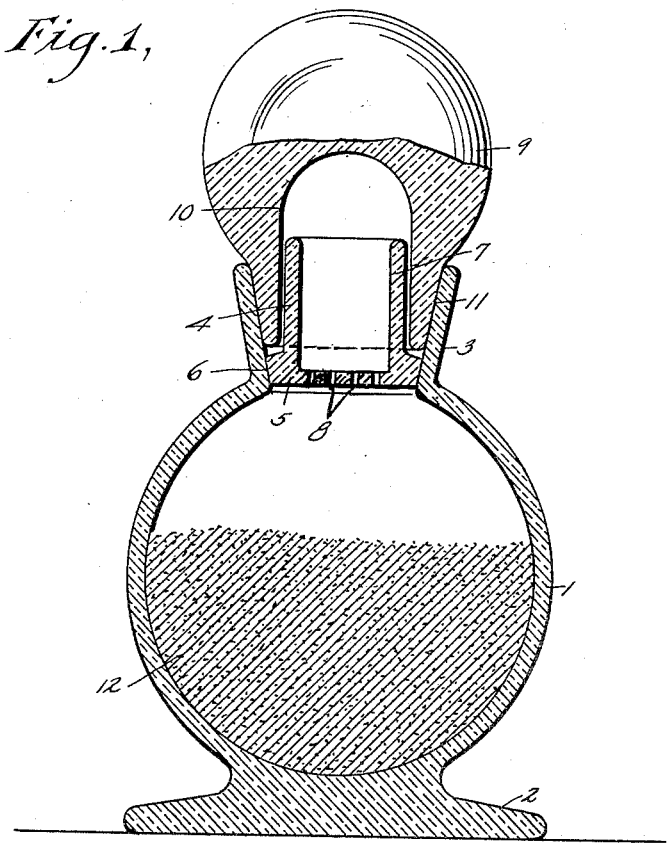
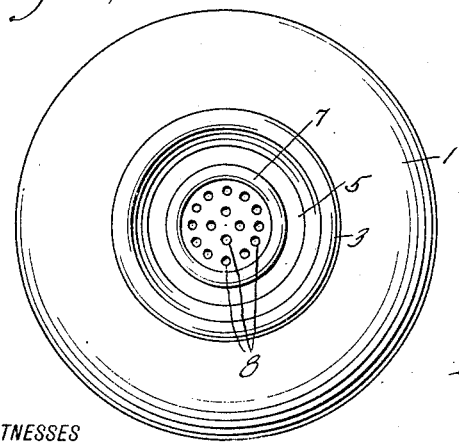
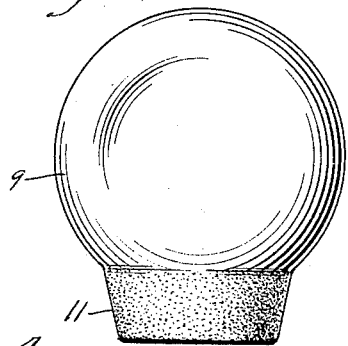
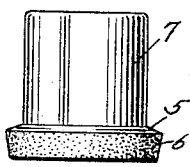
WITNESSES
Edw. Thorpe
A. W. Foster
INVENTOR
P. P. DE AGUIAR,
BY Munn & Co.
ATTORNEYS

UNITED STATES PATENT OFFICE.

PEDRO PABLO DE AGUIAR, OF HABANA, CUBA.

CONDIMENT-HOLDER.

1,346,007.　　　　Specification of Letters Patent.　　Patented July 6, 1920.

Application filed May 5, 1920. Serial No. 379,184.

*To all whom it may concern:*

Be it known that I, PEDRO PABLO DE AGUIAR, a citizen of Cuba, and a resident of Habana, in the Province of Habana and Republic of Cuba, have invented a new and Improved Condiment-Holder, of which the following is a full, clear, and exact description.

This invention relates to improvements in condiment holders, and more particularly to salt shakers, an object of the invention being to protect the salt from the moisture of the atmosphere so that it will not become lumpy or moist and can be readily shaken from the holder.

A further object is to provide a condiment holder which will be entirely sanitary, which will be comparatively cheap to manufacture, and which will be of neat and attractive appearance.

With these and other objects in view the invention consists in certain novel features of construction, and combinations and arrangements of parts, as will be more fully hereinafter described and pointed out in the claims.

In the accompanying drawings—

Figure 1 is a view mainly in longitudinal section illustrating my improved condiment holder.

Fig. 2 is a top plan view with the cover removed.

Fig. 3 is a view in side elevation of the cover.

Fig. 4 is a view in side elevation of the perforated stopper.

1 represents the body of my improved condiment holder which is preferably of cylindrical form having a base 2 and a conical flaring neck 3 at its upper end. The particular shape of the body is, of course, immaterial and may be varied to suit the trade.

In the conical neck 3 I provide a removable stopper 4. This stopper 4 has an enlarged circular lower end 5 made with a conical or tapering edge 6 to snugly fit the inner face of the neck 3 so that when the stopper is forced into place, it will be securely held therein, but can be removed as occasion may require. This stopper 4 is made with a cylindrical spout portion 7 and the bottom 5 of said stopper is made with perforations 8 of the proper size in accordance with the condiment used.

9 represents my improved cover which is provided with a central recess 10 in its lower end to accommodate the spout 7 of stopper 4 and externally at its lower end this cover 9 is made tapering or conical, as shown at 11, to snugly fit within the neck 3 and form an airtight joint with said neck to prevent contact of moisture with the salt or other condiment 12 in the body 1 when said cover is in position.

It is to be understood that when the condiment holder is not in use, the cover 9 is in place, and when the condiment is desired, the cover is removed, the holder inverted or partially inverted and shaken so as to compel the condiment 12 to pass through the perforations 8 and be guided by the spout 7 to the location desired. When the shaking operation is over, the holder is placed right-side-up and the stopper inserted to prevent possibility of moisture from the atmosphere coming in contact with the salt or the condiment to moisten the latter and thereby materially interfere with its free escape when the device is shaken.

While, of course, I may construct my improved device of any suitable material, it may be made entirely or partially of glass or other non-corrosive material and may be ornamented in any desired way to suit the trade.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A condiment holder comprising a body, an open flaring neck integral with the body, a support fitting in the neck and having a perforated bottom, a spout integral with the stopper and spaced from the interior surface of the neck and a cover fitting within the neck around the spout.

2. A condiment holder, comprising a body having a conical open neck at its upper end, a stopper having a conical lower portion adapted to fit in the lower portion of the neck, said stopper having a perforated bottom and a spout integral with the stopper and with which the perforations communicate, said spout spaced from the interior surface of the neck, and a cover for said holder.

3. A condiment holder, comprising a body having a conical open neck at its upper end, a stopper having a conical lower portion adapted to fit in the lower portion of the neck, said stopper having a perforated bottom and a spout integral with the stopper and with which the perforations communicate, and a cover having a central recess in its lower portion receiving the spout and having an external conical tapering lower end fitting within and tightly engaging the inner face of said neck.

PEDRO PABLO DE AGUIAR.